Figure 1:
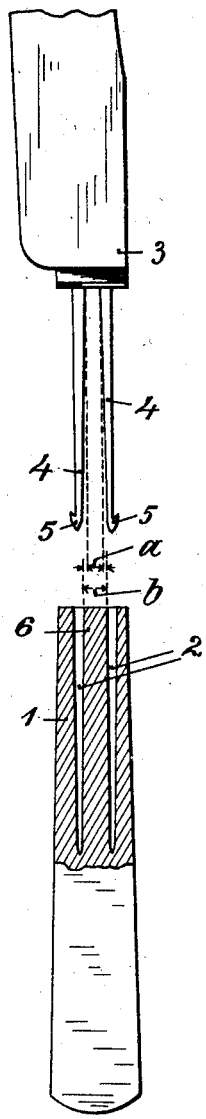

F. HOPPE.
ATTACHMENT OF KNIFE BLADES TO THEIR HANDLES.
APPLICATION FILED NOV. 8, 1910.

1,043,699.

Patented Nov. 5, 1912.

WITNESSES.
John H. Hoving.
Alfred R. Anderson.

INVENTOR:
FRITZ HOPPE
by H. van Oedenzeel
Attorney

UNITED STATES PATENT OFFICE.

FRITZ HOPPE, OF SOLINGEN, GERMANY.

ATTACHMENT OF KNIFE-BLADES TO THEIR HANDLES.

1,043,699.  Specification of Letters Patent.  Patented Nov. 5, 1912.

Application filed November 8, 1910. Serial No. 591,303.

*To all whom it may concern:*

Be it known that I, FRITZ HOPPE, a manufacturer and a subject of the Kingdom of Prussia, German Empire, residing at Solingen, Rhine Province, in the Kingdom of Prussia, German Empire, have invented a new and useful Improvement in Attachment of Knife-Blades to Their Handles; and I do hereby declare the following to be a full, clear, and exact description of the same.

This invention relates to an improved attachment of knife blades to their handles. It is already known to secure knife blades in their handles by means of several tangs, but hitherto in such construction either multiple handles were used and the connection of the separate parts of these handles were effected by means of the tangs driven into the holes thereof, or the connecting of the tangs with the handle was effected by causing the tangs forced into grooves to inclose the handle from the outside. Further it is known to use double or plural tangs the spreading shanks of which, tapered toward the end and perhaps provided with counter hooks, are pressed into a common conical boring of the handle, in the hollowed and widened end portion of which the counter hooks engage or the spreading shanks press against a wedge piece fastened at the end of the boring.

The distinctive feature of the present invention as compared with what is already known is found in the circumstance that a permanent easily manufactured fastening of the double tang into the handle takes place without aid of any further means of attachment such as cement or rivets, and is effected by making the part of the handle left between the perforations for the double tang greater than the space between the said double tangs at the junction with the blade, so that the tangs when forced into the holes of the handle are wedged apart and the terminal hooks on them are driven into the material of the handle.

The novel connection for the knife and the handle is illustrated in the accompanying drawing in three figures which show respectively a knife and a handle in separate position, the second with the tangs partly driven home, and thirdly the tangs in their final position fixed in the handle. In these three figures the handle is shown partially in section.

In these drawings are shown a pair of tangs 4, 4 attached in the usual manner to the blade 3, which tangs taper toward their ends which are provided with hooks 5, 5. The holes 2, 2 of the handle 1 are made to correspond to the shape of these tangs, so that the portion of the handle remaining between them is preferably formed tapering toward the junction.

Figure 2:
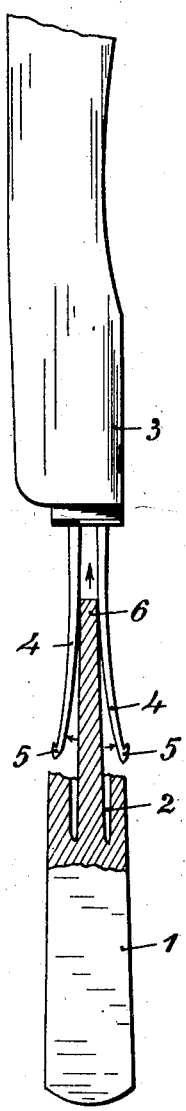
Figure 3:
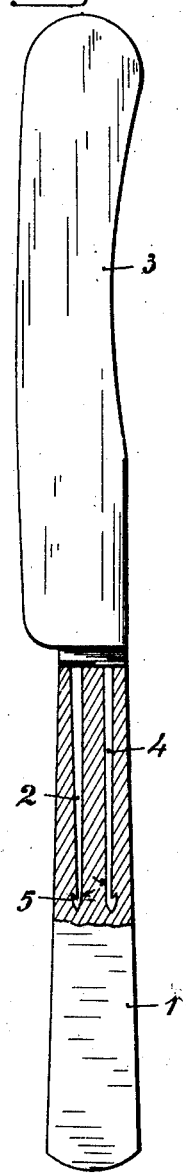

The essential feature of the invention consists in the fact already referred to that the part of the handle remaining between the holes (Figure 1) and having a width indicated by $b$ is wider than the interspace having a width indicated by $a$ between the tangs 4, 4 at the junction with the blade. This has the effect that when the tapering intermediate piece 6 is forced between the tangs 4, 4, the latter has the tendency to open out in the direction indicated by the arrow (Fig. 2). This tendency is maintained during the forcing in of the tangs 4, 4 in the holes 2, 2 of the handle 1 (Fig. 3) with the result that the hooks at the end of the tangs penetrate into the material of the handle and secure, when the tangs are fully inserted or firm, a connection between this and the handle 1 by means of the hooks 5, 5 that even when the knife is subjected to great strain not only is there no turning of the tangs in the handle but also any release or bending or breaking thereof is rendered impossible. In consequence of the widening of the wedge-shaped intermediate piece 6 as regards the interspace $a$ between the two tangs, every pressure exercised upon the knife blade in use is absorbed by the intermediate piece 6, while the outside parts of the handle are thus protected against any pressure so that splitting of the handle is successfully avoided even without the use of ferrules.

Having now particularly described and ascertained the nature of my said invention and in what manner the same is to be performed, I declare that what I claim is:

In a knife, the combination of a blade; a pair of elastic tapering tangs secured at the inner end of the blade and provided with outwardly projecting end-hooks and forming therebetween a wedge-shaped space having its smaller end at the crotch between the tangs and remote from said end hooks; a handle having a pair of longitudinal tapering parallel holes adapted to receive said tangs and forming therebetween a wedge-shaped piece integral with the handle and adapted to fit in said wedge shaped space from end to end thereof up to said crotch and in contact with the end of said blade, the width of the part of said piece at said crotch being greater than the normal space between the tangs at said crotch, whereby said tangs are forced outwardly at said crotch so that the natural elasticity of the tangs presses the outer ends thereof outwardly and presses said hooks into the material of the handle.

In testimony whereof, I have signed my name to this specification in the presence of two subscribing witnesses.

FRITZ HOPPE.

Witnesses:
  BESSIE F. DUNLAP,
  LOUIS VANDORN.